(12) United States Patent
Kao et al.

(10) Patent No.: US 8,285,069 B2
(45) Date of Patent: Oct. 9, 2012

(54) IMAGE PROCESSING DEVICE AND METHOD THEREOF

(75) Inventors: Meng-Chao Kao, Taipei (TW);
Kuo-Long Tsao, Kaohsiung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 281 days.

(21) Appl. No.: 12/750,632

(22) Filed: Mar. 30, 2010

(65) Prior Publication Data

US 2011/0243427 A1    Oct. 6, 2011

(51) Int. Cl.
*G06K 9/40* (2006.01)
*H04N 5/00* (2011.01)

(52) U.S. Cl. ............... 382/263; 382/260; 348/607

(58) Field of Classification Search ............ 382/261, 382/162, 263
See application file for complete search history.

(56) References Cited

U.S. PATENT DOCUMENTS

| | | | |
|---|---|---|---|
| 5,512,956 A * | 4/1996 | Yan | 348/606 |
| 5,880,767 A * | 3/1999 | Liu | 347/251 |
| 6,067,125 A * | 5/2000 | May | 348/607 |
| 6,178,205 B1 * | 1/2001 | Cheung et al. | 375/240.29 |
| 6,310,982 B1 * | 10/2001 | Allred et al. | 382/260 |
| 6,847,738 B1 * | 1/2005 | Scognamiglio et al. | 382/260 |
| 7,184,608 B2 * | 2/2007 | Moon | 382/266 |
| 7,474,797 B2 * | 1/2009 | Bezryadin | 382/260 |
| 7,548,278 B2 * | 6/2009 | Shin et al. | 348/607 |
| 2004/0021775 A1 * | 2/2004 | Kondo et al. | 348/207.99 |
| 2004/0032991 A1 | 2/2004 | Moon | |
| 2004/0070590 A1 * | 4/2004 | Lee et al. | 345/690 |
| 2005/0248687 A1 * | 11/2005 | Lee et al. | 348/606 |
| 2006/0028562 A1 * | 2/2006 | Schmitz et al. | 348/241 |
| 2006/0245660 A1 * | 11/2006 | Hung | 382/254 |
| 2006/0251170 A1 | 11/2006 | Ali | |
| 2007/0071342 A1 * | 3/2007 | Bilbrey et al. | 382/254 |
| 2007/0097266 A1 * | 5/2007 | Souchard | 348/571 |
| 2008/0019605 A1 * | 1/2008 | Yea et al. | 382/261 |
| 2008/0095459 A1 * | 4/2008 | Vitsnudel et al. | 382/260 |
| 2008/0106544 A1 * | 5/2008 | Lee et al. | 345/214 |
| 2008/0199100 A1 * | 8/2008 | Ishiga | 382/263 |
| 2011/0007968 A1 * | 1/2011 | Yamada | 382/165 |
| 2012/0033885 A1 * | 2/2012 | Ha et al. | 382/168 |

FOREIGN PATENT DOCUMENTS

| | | |
|---|---|---|
| TW | 538382 | 6/2003 |
| TW | 200714086 | 4/2007 |
| TW | 200717361 | 5/2007 |
| TW | 200742448 | 11/2007 |

OTHER PUBLICATIONS

"Office Action of Taiwan Counterpart Application", issued on Feb. 22, 2012, p. 1-p. 6, in which the listed references were cited.

* cited by examiner

*Primary Examiner* — Wenpeng Chen
*Assistant Examiner* — Feng Niu
(74) *Attorney, Agent, or Firm* — Jianq Chyun IP Office

(57) ABSTRACT

An image processing device and a method thereof are provided. In the image processing method, an adjusting value is computed according to a pixel of a current image and a plurality of reference pixels nearby. In addition, a weighted coefficient is computed according to a gray-scale difference between the pixel of the current image and a pixel of a previous image. Further, a weighted adjusting value is computed according to the adjusting value and the weighted coefficient. Besides, the pixel of the current image is adjusted according to the weighted adjusting value to generate a pixel of an output image. Thereby, the current image is adjusted adaptively to increase the quality of the output image.

6 Claims, 6 Drawing Sheets

|     |     |     |
| --- | --- | --- |
| 150 (1,1) | 160 (1,2) | 170 (1,3) |
| 180 (2,1) | 190 (2,2) | 170 (2,3) |
| 170 (3,1) | 160 (3,2) | 180 (3,3) |

Current image

|     |     |     |
| --- | --- | --- |
| X (1,1) | X (1,2) | X (1,3) |
| X (2,1) | X (2,2) | X (2,3) |
| X (3,1) | X (3,2) | 148 (3,3) |

Previous image

FIG. 4

| 150 (1,1) | 180 (2,1) | 170 (3,1) |
| --- | --- | --- |
| 160 (1,2) | 180 (2,2) | 160 (3,2) |
| 170 (1,3) | 170 (2,3) | 190 (3,3) |

Current image

| X (1,1) | X (2,1) | X (3,1) |
| --- | --- | --- |
| X (1,2) | 148 (2,2) | X (3,2) |
| X (1,3) | X (2,3) | X (3,3) |

Previous image

FIG. 5

| 170 (1,4) | 170 (2,4) | 170 (3,4) | 180 (4,4) |
| --- | --- | --- | --- |
| 170 (1,3) | 160 (2,3) | 190 (3,3) | 160 (4,3) |
| 170 (1,2) | 150 (2,2) | 180 (3,2) | 170 (4,2) |
| 170 (1,1) | 170 (2,1) | 170 (3,1) | 170 (4,1) |

Current image

| X (1,4) | X (2,4) | X (3,4) | 148 (4,4) |
| --- | --- | --- | --- |
| X (1,3) | X (2,3) | X (3,3) | X (4,3) |
| X (1,2) | X (2,2) | X (3,2) | X (4,2) |
| X (1,1) | X (2,1) | X (3,1) | X (4,1) |

Previous image

FIG. 6

IMAGE PROCESSING DEVICE AND METHOD THEREOF

BACKGROUND OF THE INVENTION

1. Field of the Invention

The present invention relates to an image processing technique. More particularly, the present invention relates to an image processing technique capable of dynamically and adaptively adjusting an image.

2. Description of Related Art

Along with development of multimedia technology, people have increasing demand for high quality images. However, when a liquid crystal display (LCD) displays quick dynamic images, since a response time of the LCD is not quickly enough (which is generally 1 ms-16 ms), and a backlight system thereof applies a holding type driving method, an image sticking problem is generated due to a persistence of vision phenomenon of human eyes, which is also referred to as a so-called motion blur phenomenon.

In this case, according to a conventional method, a sharpening processing technique is generally used to mitigate the motion blur phenomenon. According to the conventional sharpening processing technique, sharpening processing is performed to the whole image, so that image regions that are unnecessary to be sharpened are also sharpened.

Taking an image of a moving vehicle as an example, the conventional sharpening processing technique is used to sharpen the whole image, so that the motion blur phenomenon of the vehicle can be mitigated, though a whole image noise is aggravated. It should be noticed that if a background of the vehicle is already a clear image, the sharpening processing can lead to excessive sharpening of the background, which may cause a considerable lack of coordination, and generate noises that are unbearable to human eyes.

SUMMARY OF THE INVENTION

The present invention is directed to an image processing method, by which a quality of an output image can be improved.

The present invention is directed to an image processing device, which can dynamically and adaptively adjust an image, so as to improve a quality of an output image.

The present invention provides an image processing method. In the image processing method, a first adjusting value is computed according to a first pixel of a current image and a plurality of first reference pixels nearby. In addition, a first weighted coefficient is computed according to a gray-scale difference between the first pixel of the current image and a first pixel of a previous image. Further, a first weighted adjusting value is computed according to the first adjusting value and the first weighted coefficient. Besides, the first pixel of the current image is adjusted according to the first weighted adjusting value to generate a first pixel of an output image.

In an embodiment of the present invention, the image processing method further includes following steps. A second adjusting value is computed according to a second pixel of the current image and a plurality of second reference pixels nearby. In addition, a second weighted coefficient is computed according to a gray-scale difference between the second pixel of the current image and a second pixel of the previous image. Further, a second weighted adjusting value is computed according to the second adjusting value and the second weighted coefficient. Besides, the second pixel of the current image is adjusted according to the second weighted adjusting value to generate a second pixel of the output image.

In an embodiment of the present invention, the first pixel of the current image and the first reference pixels nearby form an M×N pixel array, wherein M and N are positive integers greater than or equal to 2. In another embodiment, the first pixel of the current image is located at a lower right corner of the pixel array. In still another embodiment, the first adjusting value is equal to a gray-scale of the first pixel of the current image minus an average gray-scale of the first pixel of the current image and the first reference pixels nearby.

In an embodiment of the present invention, the step of computing the first weighted coefficient includes dividing the gray-scale difference between the first pixel of the current image and the first pixel of the previous image by a base value to obtain the first weighted coefficient. In another embodiment, the first weighted adjusting value is equal to the first adjusting value multiplies the first weighted coefficient. In still another embodiment, a gray-scale of the first pixel of the output image is equal to the gray-scale of the first pixel of the current image plus the first weighted adjusting value.

The present invention provides an image processing device including a storage unit and a computing unit. The storage unit is used for storing a previous image. The computing unit is coupled to the storage unit, and computes an adjusting value according to a pixel of a current image and a plurality of reference pixels nearby, and computes a weighted coefficient according to a gray-scale difference between the pixel of the current image and a pixel of a previous image. Further, the computing unit computes a weighted adjusting value according to the adjusting value and the weighted coefficient, and adjusts the pixel of the current image according to the weighted adjusting value to generate a pixel of an output image, wherein the pixel of the current image, the pixel of the previous image and the pixel of the output image are mutually corresponded.

According to the above descriptions, in the present invention, the adjusting value is computed according to the pixel of the current image and a plurality of reference pixels nearby. Moreover, the weighted coefficient is computed according to the gray-scale difference between the pixel of the current image and the pixel of the previous image. Further, the current image is adjusted according to the adjusting value and the weighted coefficient. In this way, the current image can be adaptively adjusted, so as to improve a quality of the output image.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a schematic diagram of image blocks of FIG. 3.

FIG. 5 is a schematic diagram of image blocks according to another embodiment of the present invention.

FIG. 6 is a schematic diagram of image blocks according to still another embodiment of the present invention.

DESCRIPTION OF THE EMBODIMENTS

Figure 1:
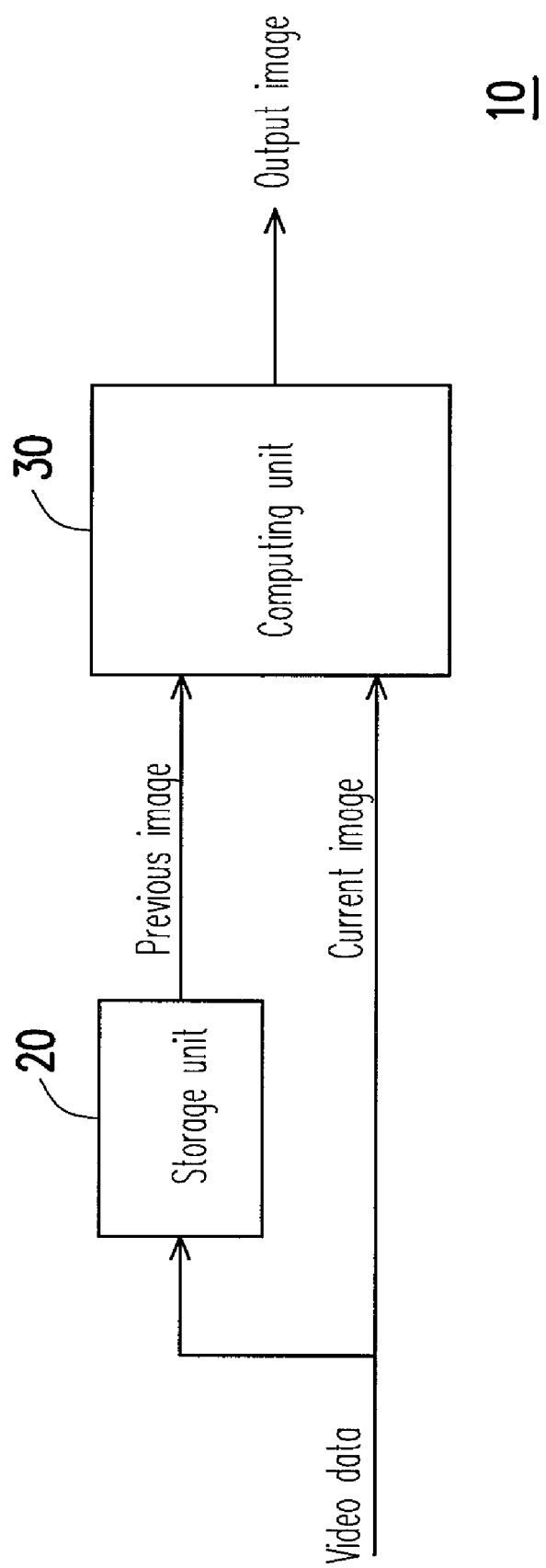
FIG. 1 is a block diagram illustrating an image processing device according to a first embodiment of the present invention.

A sharpening processing technique of a conventional technology is to perform the sharpening processing to a whole image, so that image regions that are unnecessary to be sharpened are also sharpened, which may cause noises that are unbearable to human eyes.

In this case, embodiments of the present invention provide an image processing technique, which can determine whether each block of a current image is a dynamic image or a static image. Then, a sharpening effect of the dynamic part of the image is strengthened, so as to mitigate a motion blur phenomenon. Moreover, a sharpening effect of the static part of the image is weakened (or even the sharpening processing is not performed), so as to avoid generating the noises. In this way, the current image can be dynamically and adaptively adjusted to improve a quality of an output image. The embodiments of the present invention are described in detail below with reference of the following drawings, in which exemplary embodiments of the invention are shown, wherein like reference numerals refer to the like elements throughout.

FIG. 1 is a block diagram illustrating an image processing device according to a first embodiment of the present invention. Referring to FIG. 1, in the present embodiment, the image processing device 10 may include a storage unit 20 and a computing unit 30. The storage unit 20 is coupled to the computing unit 30. The storage 20 and the computing unit 30 can receive video data. It should be noticed that the storage unit 20 is, for example, a frame buffer, which can be used to store images and provide a previous image to the computing unit 30. The computing unit 30 can receive a current image and adjust the current image according to the previous image provided by the storage unit 20 to generate an output image.

In the present embodiment, the computing unit 30 may include an average computing unit, an adding circuit, a subtracting circuit, a multiplying circuit and a dividing circuit, though the present invention is not limited thereto. In the other embodiments, those skilled in the art can modify the implementation of the computing unit 30 according to an actual design requirement. For example, the computing unit 30 can also include a table look-up circuit, so as to effectively reduce an amount of computation.

From another point of view, the storage unit 20 receives and stores an N-th frame during an N-th frame period, and provides the N-th frame to the computing unit 30 during an (N+1)-th frame period, wherein N is a nature number. During the (N+1)-th frame period, the computing unit 30 receives an (N+1)-th frame, and adjusts the (N+1)-th frame according to the N-th frame provided by the storage unit 20, so as to generate an output image. Deduced by analogy, the storage unit 20 receives and stores the (N+1)-th frame during the (N+1)-th frame period, and provides the (N+1)-th frame to the computing unit 30 during an (N+2)-th frame period. During the (N+2)-th frame period, the computing unit 30 receives an (N+2)-th frame, and adjusts the (N+2)-th frame according to the (N+1)-th frame provided by the storage unit 20, so as to generate the output image. A further description is made below with reference of a flowchart.

Figure 2:
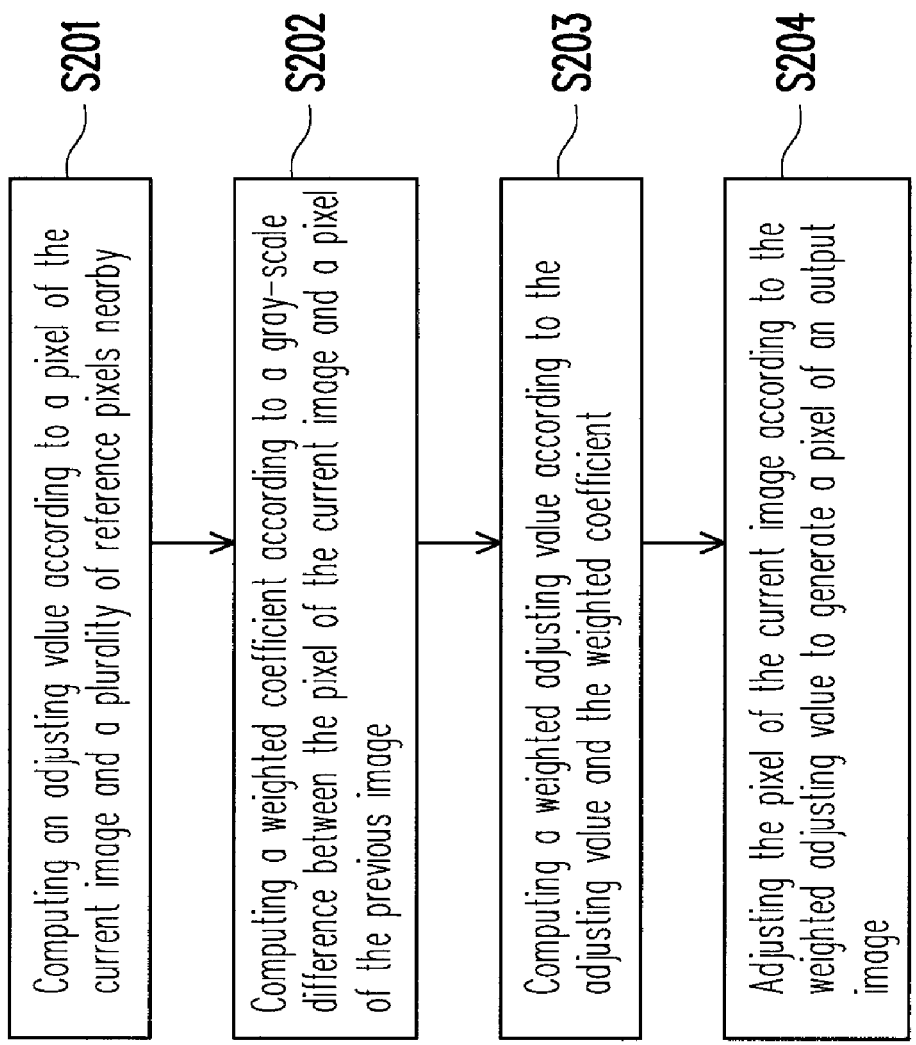
FIG. 2 is a flowchart illustrating an image processing method according to a first embodiment of the present invention.
Figure 3:
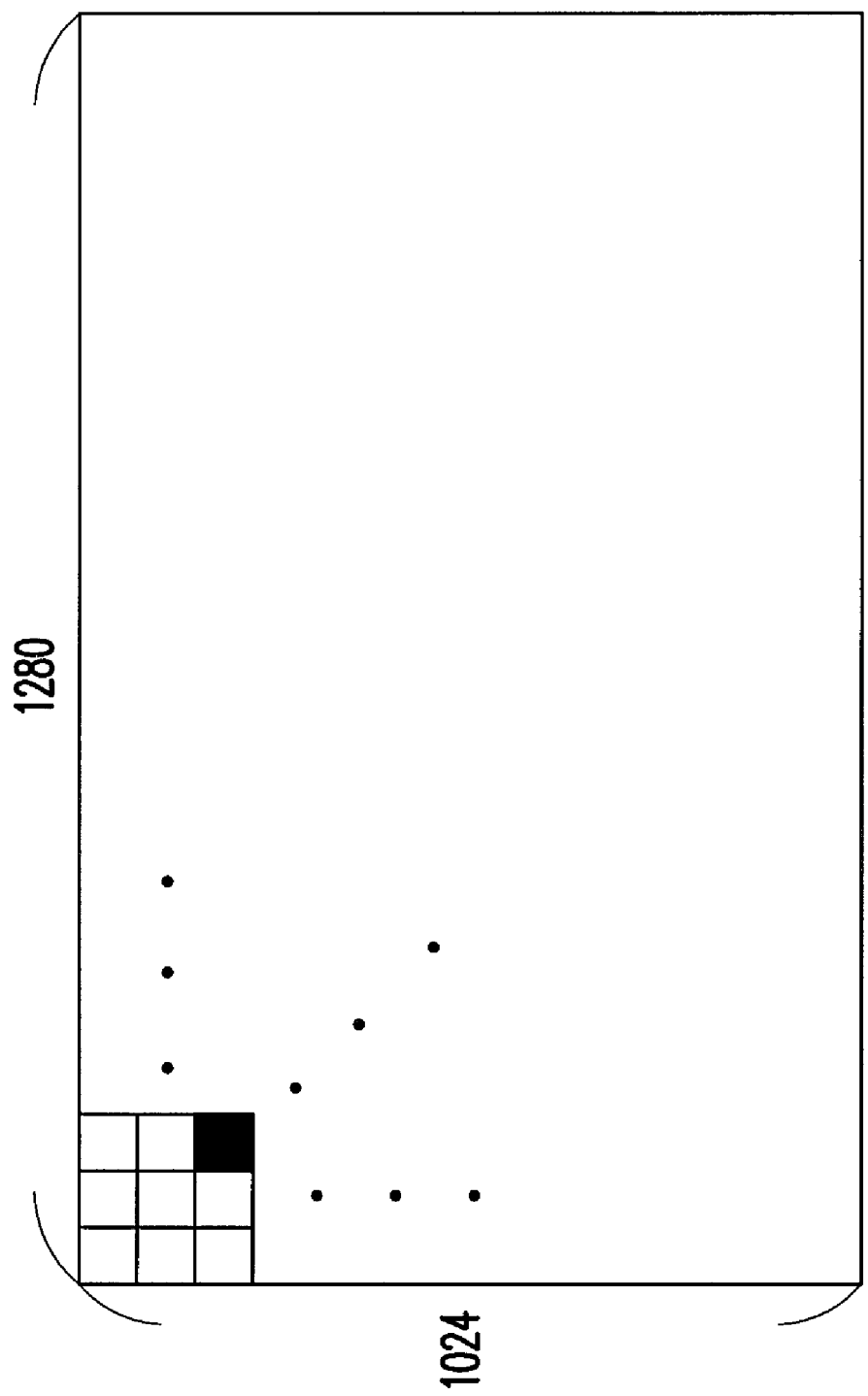
FIG. 3 is a schematic diagram illustrating an image according to a first embodiment of the present invention.

FIG. 2 is a flowchart illustrating an image processing method according to the first embodiment of the present invention. FIG. 3 is a schematic diagram illustrating an image according to the first embodiment of the present invention. FIG. 4 is a schematic diagram of image blocks of FIG. 3. In the present embodiment, assuming an image resolution is 1280×1024 (as shown in FIG. 3), though the present invention is not limited thereto, and in the other embodiments, the other resolutions can also be used, for example, 1024×768, etc. Moreover, it is assumed that the storage unit 20 has already stored the previous image. A process that the computing unit 30 adjusts the current image according to the previous image provided by the storage unit 20 to generate the output image after receiving the current image is described in detail below.

In the present embodiment, gray-scales of pixels (1,1), (1,2), (1,3), (2,1), (2,2), (2,3), (3,1), (3,2) and (3,3) of the current image are, for example, 150, 160, 170, 180, 190, 170, 170, 160 and 180. A gray-scale of a pixel (3,3) of the previous image is, for example, 148 (as shown in FIG. 4). A process of obtaining a gray-scale of the pixel (3,3) of the output image is first taken as an example for description.

In step S201, the computing unit 30 computes an adjusting value according to a pixel of the current image and a plurality of reference pixels nearby. It should be noticed that implementations of the step S201 are diversified, and a selective implementation thereof is provided below for reference, though the present invention is not limited thereto. In the other embodiments, those skilled in the art can also modify the implementation of the step S201 according to an actual requirement.

In the step S201 of the present embodiment, the pixel (3,3) of the current image is taken as an example for description, and the nearby reference pixels thereof are, for example, the pixels (1,1), (1,2), (1,3), (2,1), (2,2), (2,3), (3,1) and (3,2). The adjusting value can be obtained by subtracting an average gray-scale of the pixels (1,1), (1,2), (1,3), (2,1), (2,2), (2,3), (3,1), (3,2) and (3,3) from the gray-scale of the pixel (3,3). Since the average gray-scale of the pixels (1,1), (1,2), (1,3), (2,1), (2,2), (2,3), (3,1), (3,2) and (3,3) is equal to (150+160+170+180+190+170+170+160+180)/9=170, in the present embodiment, the adjusting value=180−170=10.

It should be noticed that the step S201 is used for computing the adjusting value according to a contrast level between the pixel (3,3) of the current image and the nearby pixels, so as to facilitate the image processing of the follow-up steps. Namely, the greater the adjusting value obtained according to the step S201 is, the further the pixel (3,3) of the current image and the nearby pixels approach a high contrast image. Conversely, the smaller the adjusting value obtained according to the step S201 is, the further the pixel (3,3) of the current image and the nearby pixels approach a low contrast image. Generally, during the image processing, the sharpening effect of the high contrast image is strengthened, and the sharpening effect of the low contrast image is maintained or weakened. Taking an image of a human figure as an example, the above method can clarify the hair of the human figure and soften the skin of the human figure to avoid generating spots.

Next, in step S202, a weighted coefficient is computed according to a gray-scale difference between the pixel of the current image and a pixel of the previous image. In the present embodiment, a method of computing the gray-scale difference between the pixel of the current image and the pixel of the previous image is to subtract the gray-scale of the pixel (3,3) of the previous image from the gray-scale of the pixel (3,3) of the current image, the gray-scale difference=180−148=32. Then, the gray-scale difference is divided by a base value to obtain the weighted coefficient. For example, the base value can be 64, so that the weighted coefficient=32/64=0.5. Those skilled in the art should understand that the base value of 64 is only an example, and in the other embodiments, the base value can be changed according to an actual requirement.

The weighted coefficient obtained according to the step S202 represents a degree that the pixel (3,3) of the current image approaches a dynamic image. The greater the weighted coefficient is, the further the pixel (3,3) of the current image approaches the dynamic image. Conversely, the smaller the weighted coefficient is, the further the pixel (3,3) of the current image approaches a static image. Generally, when a liquid crystal display (LCD) displays the dynamic image, a motion blur phenomenon is liable to be occurred. Although the motion blur phenomenon can be mitigated through the image sharpening processing, noises can be accordingly generated. The weighted coefficient obtained according to the step S202 is generated to facilitate the follow-up imaging processing, so that the sharpening processing is only performed to the dynamic image, and the static image is unnecessary to be sharpened or a sharpening effect thereof is weakened.

After the adjusting value and the weighted coefficient are obtained according to the steps S201 and S202, a step S203 is executed, by which a weighted adjusting value is computed according to the adjusting value and the weighted coefficient. In the present embodiment, the weighted adjusting value can be obtained by multiplying the adjusting value and the weighted coefficient, the weighted adjusting value=10× 0.5=5.

It should be noticed that in the step S203, the adjusting value is multiplied with the weighted coefficient to obtain the weighted adjusting value, so that if one of the adjusting value and the weighted coefficient is 0, the weighted adjusting value is 0. Namely, if the pixel (3,3) of the current image is a smooth uniform image or a static image, the weighted adjusting value is 0, so as to effectively avoid generating the obtrusive noises.

Next, in step S204, the pixel of the current image is adjusted according to the weighted adjusting value to generate a pixel of an output image. For example, the gray-scale of the pixel (3,3) of the current image and the weighted adjusting value are added to obtain the gray-scale of the pixel (3,3) of the output image, the gray-scale of the pixel (3,3) of the output image=180+5=185.

According to the above descriptions of the steps S201-S204, a sharpening degree of the image processing is determined according to a degree that each block of the current image approaches the dynamic image and a degree that each block of the current image approaches the high contrast image. Therefore, not only detail textures of the image can be effectively enhanced to mitigate the motion blur phenomenon, but also generation of the obtrusive noises can be avoided.

According to the descriptions of the above steps S201-S204, those skilled in the art can easily obtain gray-scales of the other pixels of the output image. For example, the gray-scale of the pixel (3,3) of the output image is obtained according to the pixels (1,1), (1,2), (1,3), (2,1), (2,2), (2,3), (3,1), (3,2) and (3,3) and the pixel (3,3) of the previous image. Deduced by analogy, the steps S204-S204 are repeated to obtain a gray-scale of a pixel (3,4) of the output image according to the pixels (1,2), (1,3), (1,4), (2,2), (2,3), (2,4), (3,2), (3,3) and (3,4) and a pixel (3,4) of the previous image. In this way, the whole output image can be obtained.

It should be noticed that though a possible pattern of the image processing device and the image processing method has been described in the above embodiment, it should be understood by those skilled in the art that the design of the image processing device and the image processing method varies along with different manufacturers, thus, application of the present invention should not be limited to the above possible pattern. In other words, the spirit of the present invention is met as long as the adjusting value is computed according to the pixel of the current image and the nearby reference pixels, the weighted coefficient is computed according to the gray-scale difference between the pixel of the current image and the pixel of the previous image, and the current image is adjusted according to the adjusting value and the weighted coefficient. Embodiments are provided below to provide a further understanding of the invention for those skilled in the art.

Referring to FIG. 2 again, although the steps S201 and S202 are sequentially executed, the present invention is not limited thereto. In the other embodiments, the step S202 can be first executed, and then the step S201 is executed, which may also achieve the similar function.

Referring to FIG. 2 and FIG. 4, in the step S201 of the aforementioned embodiment, although the adjusting value of the pixel (3,3) of the output image is computed according to the pixels (1,1), (1,2), (1,3), (2,1), (2,2), (2,3), (3,1), (3,2) and (3,3) of the current image and the pixel (3,3) of the previous image, the present invention is not limited thereto. For example, FIG. 5 is a schematic diagram of image blocks according to another embodiment of the present invention. According to the embodiment of FIG. 5, in the step S201, an adjusting value of a pixel (2,2) of the output image can be computed according to the pixels (1,1), (1,2), (1,3), (2,1), (2,2), (2,3), (3,1), (3,2) and (3,3) of the current image and a pixel (2,2) of the previous image.

Further, FIG. 6 is a schematic diagram of image blocks according to still another embodiment of the present invention. According to the embodiment of FIG. 6, in the step S201, an adjusting value of a pixel (4,4) of the output image can be computed according to the pixels (1,1), (1,2), (1,3), (1,4), (2,1), (2,2), (2,3), (2,4), (3,1), (3,2), (3,3), (3,4), (4,1), (4,2), (4,3) and (4,4) of the current image and a pixel (4,4) of the previous image. It should be noticed that during processes of generating the pixels of the output image, the same implementation method is recommended to be used to avoid generating unnecessary noise.

In summary, in the present invention, the adjusting value is computed according to the pixel of the current image and a plurality of the reference pixels nearby. Moreover, the weighted coefficient is computed according to the gray-scale difference between the pixel of the current image and the pixel of the previous image. Further, the current image is adjusted according to the adjusting value and the weighted coefficient. In this way, the current image can be adaptively adjusted, so that not only detail textures of the image can be effectively enhanced to mitigate the motion blur phenomenon, but also generation of the obtrusive noises can be avoided. Moreover, the embodiments of the present invention further have following advantages:

1. When a table look-up circuit is used, an amount of computation of the computing unit can be effectively reduced, and a computing speed can be accelerated.
2. According to the step S201, the sharpening effect of the high contrast image can in strengthened, and the sharpening effect of the low contrast image can be maintained or weakened.
3. The weighted coefficient obtained according to the step S202 can be used to facilitate the follow-up image processing, so that the sharpening processing is only performed to the dynamic image, and the static image is unnecessary to be sharpened or a sharpening effect thereof is weakened.
4. If the pixel (3,3) of the current image is a smooth uniform image or a static image, the weighted adjusting value obtained according to the step S203 is 0, so as to effectively avoid generating the obtrusive noises.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method, comprising:
   computing a first adjusting value according to a first pixel of a current image and a plurality of first reference pixels nearby;
   computing a first weighted coefficient by dividing a gray-scale difference between the first pixel of the current image and the first pixel of the previous image by a base value to obtain the first weighted coefficient;
   computing a first weighted adjusting value according to the first adjusting value and the first weighted coefficient; and
   adjusting the first pixel of the current image according to the first weighted adjusting value to generate a first pixel of an output image; wherein
   the first weighted adjusting value is equal to the first adjusting value multiplies the first weighted coefficient, and
   a gray-scale of the first pixel of the output image is equal to the gray-scale of the first pixel of the current image plus the first weighted adjusting value.

2. The image processing method as claimed in claim 1, further comprising:
   computing a second adjusting value according to a second pixel of the current image and a plurality of second reference pixels nearby;
   computing a second weighted coefficient according to a gray-scale difference between the second pixel of the current image and a second pixel of the previous image;
   computing a second weighted adjusting value according to the second adjusting value and the second weighted coefficient; and
   adjusting the second pixel of the current image according to the second weighted adjusting value to generate a second pixel of the output image.

3. The image processing method as claimed in claim 1, wherein the first pixel of the current image and the first reference pixels nearby form an M×N pixel array, wherein M and N are positive integers greater than or equal to 2.

4. The image processing method as claimed in claim 3, wherein the first pixel of the current image is located at a lower right corner of the pixel array.

5. The image processing method as claimed in claim 1, wherein the first adjusting value is equal to a gray-scale of the first pixel of the current image minus an average gray-scale of the first pixel of the current image and the first reference pixels nearby.

6. An image processing device, comprising:
   a storage unit, for storing a previous image; and
   a computing unit, coupled to the storage unit, for computing an adjusting value according to a pixel of a current image and a plurality of reference pixels nearby, computing a weighted coefficient by dividing a gray-scale difference between the pixel of the current image and the pixel of the previous image by a base value to obtain the weighted coefficient, computing a weighted adjusting value according to the adjusting value and the weighted coefficient, and adjusting the pixel of the current image according to the weighted adjusting value to generate a pixel of an output image, wherein the pixel of the current image, the pixel of the previous image and the pixel of the output image are mutually corresponded; wherein
   the first weighted adjusting value is equal to the first adjusting value multiplies the first weighted coefficient, and
   a gray-scale of the first pixel of the output image is equal to the gray-scale of the first pixel of the current image plus the first weighted adjusting value.

* * * * *